(12) United States Patent
Fruchter et al.

(10) Patent No.: US 11,622,135 B2
(45) Date of Patent: Apr. 4, 2023

(54) BANDWIDTH ALLOCATION FOR LOW LATENCY CONTENT AND BUFFERED CONTENT

(71) Applicant: Synamedia Limited, Staines Upon Thames (GB)

(72) Inventors: Avi Fruchter, Neve Daniel (IL); Ilan Cohen, Herzliya (IL); Zorach Reuven Wachtfogel, Elazar (IL)

(73) Assignee: Synamedia Limited, Staines Upon (GB)

(*) Notice: Subject to any disclaimer, the term of this patent is extended or adjusted under 35 U.S.C. 154(b) by 0 days.

(21) Appl. No.: 17/355,454

(22) Filed: Jun. 23, 2021

(65) Prior Publication Data

US 2022/0417571 A1 Dec. 29, 2022

(51) Int. Cl.
| | |
|---|---|
| *G06F 13/00* | (2006.01) |
| *H04N 21/234* | (2011.01) |
| *H04N 21/262* | (2011.01) |
| *H04N 21/238* | (2011.01) |
| *H04N 21/24* | (2011.01) |

(52) U.S. Cl.
CPC . *H04N 21/23406* (2013.01); *H04N 21/23805* (2013.01); *H04N 21/2402* (2013.01); *H04N 21/262* (2013.01)

(58) Field of Classification Search
CPC ....... H04N 21/23406; H04N 21/23805; H04N 21/2402; H04N 21/262; H04L 41/0896; H04L 41/08; H04L 47/10; H04L 47/12; H04L 47/125; H04L 43/0876; H04L 43/0888

USPC .......... 709/226, 234, 235, 232, 231
See application file for complete search history.

(56) References Cited

U.S. PATENT DOCUMENTS

| | | | | |
|---|---|---|---|---|
| 6,810,031 | B1* | 10/2004 | Hegde | H04Q 11/0478 370/351 |
| 8,595,415 | B2* | 11/2013 | Van Aken | G06F 12/0246 711/E12.008 |
| 8,626,989 | B2* | 1/2014 | Van Aken | G06F 12/0246 711/201 |
| 10,057,014 | B2* | 8/2018 | Chang | H04L 1/0015 |
| 2012/0198128 | A1* | 8/2012 | Van Aken | G06F 12/0246 711/E12.008 |
| 2012/0198129 | A1* | 8/2012 | Van Aken | G06F 12/0246 711/E12.008 |
| 2014/0351638 | A1* | 11/2014 | Chang | H04L 1/08 714/18 |

* cited by examiner

*Primary Examiner* — Kenneth R Coulter
(74) *Attorney, Agent, or Firm* — Fernando & Partners, LLP (57) ABSTRACT

Techniques for allocating bandwidth for low latency content and buffered content are described. In accordance with various embodiments, a bandwidth allocation method is performed at a device (e.g., a server) with one or more processors and a non-transitory memory. The server determines available bandwidth for delivering content to a client device in a stream, where the stream includes low latency content and buffered content. The server further identifies characteristics of the low latency content. The server then allocates a first portion of the available bandwidth to the low latency content and a second portion of the available bandwidth to the buffered content based on the characteristics of the low latency content.

20 Claims, 8 Drawing Sheets

BANDWIDTH ALLOCATION FOR LOW LATENCY CONTENT AND BUFFERED CONTENT

TECHNICAL FIELD

The present disclosure relates generally to multimedia content delivery and, more specifically, to allocating bandwidth when streaming content that includes low latency content and buffered content.

BACKGROUND

Client buffer compensates for variations in multimedia streaming and ensures continuous playback in the case of temporary network degradation. For a smooth viewing experience, the client buffer cannot be filled too fast or too slow. In a system that streams multimedia content including a mixture of low latency content and buffered content, not allocating the bandwidth appropriately to each portion may cause client buffer underflow and/or overflow, thus affecting user experience. For example, when the bandwidth allocation to the low latency content is too low, the low latency content being presented may not provide immediate responses. On the other hand, when the bandwidth allocation to the low latency content is too high, the remaining bandwidth may not be sufficient to fill the client buffer with buffered content in time, thus affecting the delivery of the buffered content.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

OVERVIEW

In accordance with some embodiments, a server in a multimedia content delivery system described herein allocates available bandwidth to low latency content and buffered content when streaming content to a client device. From the client perspective, the client device receives a single stream, while the content delivered through the stream includes multiplexed low latency content and buffered content. In some embodiments, the server receives statistical parameters from client devices and uses the statistical parameters to determine the available bandwidth. Further, in some embodiments, the server analyzes the content and determines the required bandwidth for the low latency and/or the buffered content, e.g., learning based on historical data for the low latency and/or categorizing the buffering content. Based on the analysis, in some embodiments, a low latency content generator enters a low action mode to generate the low latency content with lower bitrate, thus allowing more bandwidth for filling the client buffer with the buffered content. In some other embodiments, based on the analysis, certain portions of the buffered content do not require high bandwidth to maintain a reasonable quality. Accordingly, for the duration of sending both the low latency content and the buffered content, the lower bandwidth requirement for the buffered content allows the server to allocate more bandwidth for streaming the low latency content. By balancing the bandwidth requirements for the low latency content and the buffered content, the server described herein maintains the depth of the client buffer for an improved user experience.

In accordance with various embodiments, a bandwidth allocation method is performed at a device (e.g., a server) with one or more processors and a non-transitory memory. The method includes determining available bandwidth for delivering content to a client device in a stream, wherein the stream includes low latency content and buffered content. The method further includes identifying characteristics of the low latency content. The method also includes allocating a first portion of the available bandwidth to the low latency content and a second portion of the available bandwidth to the buffered content based on the characteristics of the low latency content.

EXAMPLE EMBODIMENTS

The multimedia content delivery system described herein improves user experience and addresses the aforementioned client buffer issues when streaming multimedia content that includes a mixture of low latency content and buffered content. When low latency content is presented and at the same time, the buffered content is being filled in a client buffer, depending on the available bandwidth as well as characteristics of the low latency content and/or the buffered content, a server sets and adjusts the bandwidth allocation to the low latency content and the buffered content. The balanced approach ensures the system provides an interactive user experience while presenting the low latency content and simultaneously accumulates sufficient buffered content frames in the client buffer for future presentation.

Determining the bandwidth allocation at the server in accordance with various embodiments described herein has several advantages. First, many client devices have limited computing resources, and bandwidth allocation often requires computational capacities that such client devices do not have. Second, client devices typically do not have visibility to the bandwidth requirement while the server can obtain information for determining the bandwidth allocation among different content types. For example, manifests for buffered content (e.g., adaptive bitrate (ABR) videos) can specify bitrate(s) for the buffered content. However, low latency content (e.g., UI content generated in response to user actions or without user actions) may not have a manifest that specifies the bandwidth requirements. The server can learn the bandwidth requirements for low latency content based on historical data upon the server providing the low latency content in accordance with some embodiments, while such information is unavailable to client devices. Accordingly, the server based bandwidth allocation methods, devices, and systems described herein improve the accuracy of bandwidth allocation and dynamically adjust the bandwidth allocation for an improved user experience.

Figure 1:
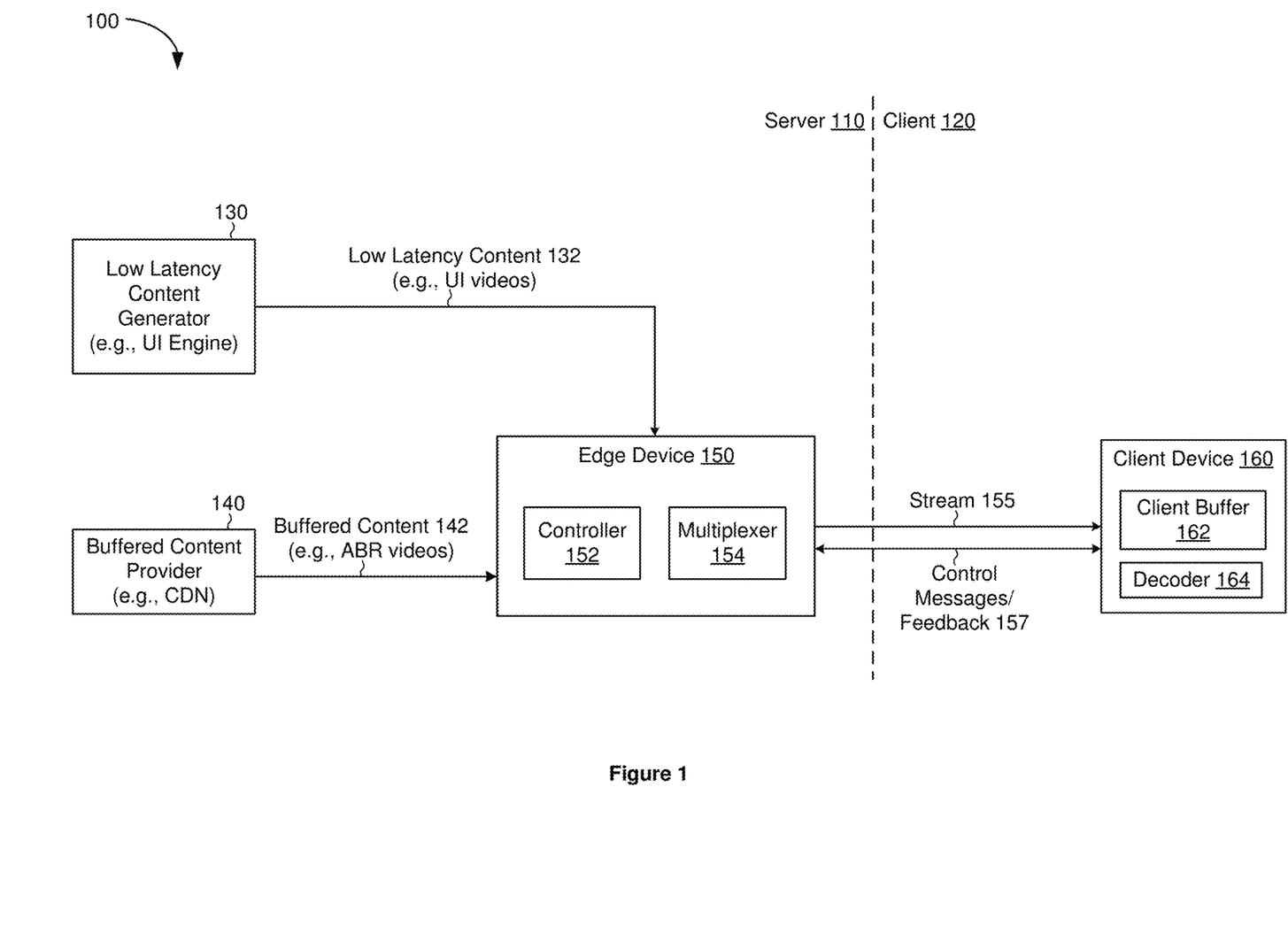
FIG. 1 is a block diagram of an exemplary multimedia content delivery system, in accordance with some embodiments.

Reference is now made to FIG. 1, which is a block diagram of an exemplary multimedia content delivery system 100 in accordance with some embodiments. The media content (also referred to hereinafter as "multimedia content", "media content item(s)", or "content") can include any multimedia data, such as visual data, audio data, and/or text, etc. In some embodiments, the content delivery system 100 includes a server side 110 for delivering multimedia content and a client side 120 for receiving the multimedia content.

On the client side 120, an exemplary client device 160 includes a client buffer 162 for buffering the received media content to facilitate decoding, network interface(s) (not shown) for connecting to the server side 110, and a decoder 164 for decoding the received media content. In some embodiments, the client device 160 also includes input device(s) (not shown) for receiving inputs from a user, e.g., a button, a voice recorder, and/or a sensor, etc.

In some embodiments, the server side 110 includes a virtual set top platform that renders user interfaces (UIs) and provides rendered UIs to the client side 120. In some embodiments, upon receiving an input from the user, where the input corresponds to one or more requests for media content, the client device 160 sends the request(s) to the server 110 and receives from the server 110 low latency content (e.g., one or more rendered UIs) and/or the requested media content as buffered content in a stream 155. It should be noted that the client device 160 can further include separate devices for sending the request(s) and/or receiving the stream 155 in accordance with some embodiments. For example, a separate device paired with a set top box, e.g., a smartphone that acts as a remote, can send the request(s) to the server 110. As such, the client device 160 can include the set top box and the smartphone.

On the server side 110, in some embodiments, a low latency content generator 130 provides low latency content 132, e.g., a user interface (UI) engine that encodes and/or renders low latency content such as UI videos. As such, though not shown in FIG. 1, in some embodiments, the low latency content generator 130 includes one or more encoders and/or re-encoders that encode the low latency content 132. For instance, the low latency content generator 130 can include encoders/re-encoders for encoding raw content (e.g., content that has not been compressed and/or encoded) from recorded content and/or live broadcast. Alternatively, the encoders/re-encoders can include at least one decoder and at least one encoder, such that the low latency content generator 130 obtains an encoded stream, decodes the stream, blends UI objects with the decoded stream, and re-encodes a blended stream as the low latency content 132. In some embodiments, the low latency content generator 130 obtains the raw content and/or the encoded content from a variety of sources, including but not limited to, from one or more content delivery network (CDN) instances.

Also on the server side 110, a buffered content provider 140 provides buffered content 142, e.g., a CDN providing adaptive bitrate (ABR) videos. Additionally, on the server side 110, an edge device 150 includes a controller 152 and a multiplexer 154 in accordance with some embodiments. In some embodiments, the controller 152 determines the switching between the low latency content 132 and the buffered content 142, as well as the bandwidth allocation between the low latency content 132 and the buffered content 142. The switching can be in response to request(s) from the client device 160, e.g., in response to a user pressing a pause or play button, or initiated by the server 110 without user inputs, e.g., the server 110 publishing a message in accordance with some embodiments.

In some embodiments, the multiplexer 154 multiplexes the low latency content 132 and the buffered content 142 into one stream 155. The edge device 150 then delivers the stream 155 to the client device 160. In some embodiments, the controller 152 and/or the multiplexer 154 apply one or more protocols to packetize the data, such as a real-time transport protocol (RTP), a user datagram protocol (UDP), and/or an Internet protocol (IP). To prepare the media data, the low latency content generator 130 and the buffered content provider 140 can apply any number of audio and video formatting techniques following any standards, such as H.264, Opus, Advanced Video Coding (AVC), or the High Efficiency Video Coding (HEVC) standard, Dynamic Adaptive Streaming over HTTP (DASH), and/or HTTP Live Streaming (HLS), etc.

In some embodiments, the server side 110 and the client side 120 exchange control messages and/or feedback 157. For example, the controller 152 and/or the multiplexer 154 generate real-time transport control protocol (RTCP) packets along with the RTP packets for syncing, performance-related statistical parameters, rate adaptation, or the like. In particular, based on the feedback 157 from the client device 160, the controller 152 derives network conditions and client capacities, such as packet loss, history of successful bitrate, depth of the client buffer 162, and/or available bandwidth, etc. Based on the derived information, the controller 152 allocates a portion of the available bandwidth to the low latency content 132 and another portion of the available bandwidth to the buffered content 142. The server 110 then, according to the bandwidth allocation, streams the low latency content 132 and at the same time fills the client buffer 162 with the buffered content 142.

As used herein, the low latency content 132 is decoded, rendered, and/or presented immediately by the client device, whereas at least a portion of the buffered content 142 is stored in the client buffer 162 for future decoding, rendering, and/or presentation. In some embodiments, the low latency content 132 includes rendered UI objects corresponding to UI elements and/or segments of videos corresponding to interactions. For an interactive experience, the low latency content 132 requires low latency encoding. As such, the buffer size in the client buffer 162 for UI videos is small and less than a threshold, e.g., 250 ms. In contrast, in some embodiments, the buffered content 142 includes ABR videos that have a high decoding delay. As such, the client buffer for the buffered content 142 is deep, e.g., the buffer size for the buffered content 142 is greater than a threshold, such as 10s of seconds of video content. The deeper client buffer ensures a strong quality of experience, e.g., providing continued playback of the buffered content 142 in case of temporary network degradation.

Although a single low latency content generator 130, a single buffered content provider 140, a single edge device 150, and a single client device 160 are illustrated in FIG. 1, the system 100 may include one or more low latency content generators 130 (e.g., a pool of UI engines), one or more buffered content providers 140 (e.g., multiple CDNs), one or more edge devices 150, as well as one or more client devices 160. For the sake of simplicity, the subject matter will be described herein for the most part with reference to a single low latency content generator 130, a single buffered content provider 140, a single edge device 150, and a single client device 160. It should be also noted that in the system 100, any part of the components on the server side 110 can be deployed and/or re-configured on one or more servers that are not co-located, separated, and/or distributed. For example, the CDN(s) 140 can be on a different server from the UI engine(s) 130. In another example, the UI engine(s) 130 and the CDN(s) 140 are on different servers from the edge device 150.

Figure 2:
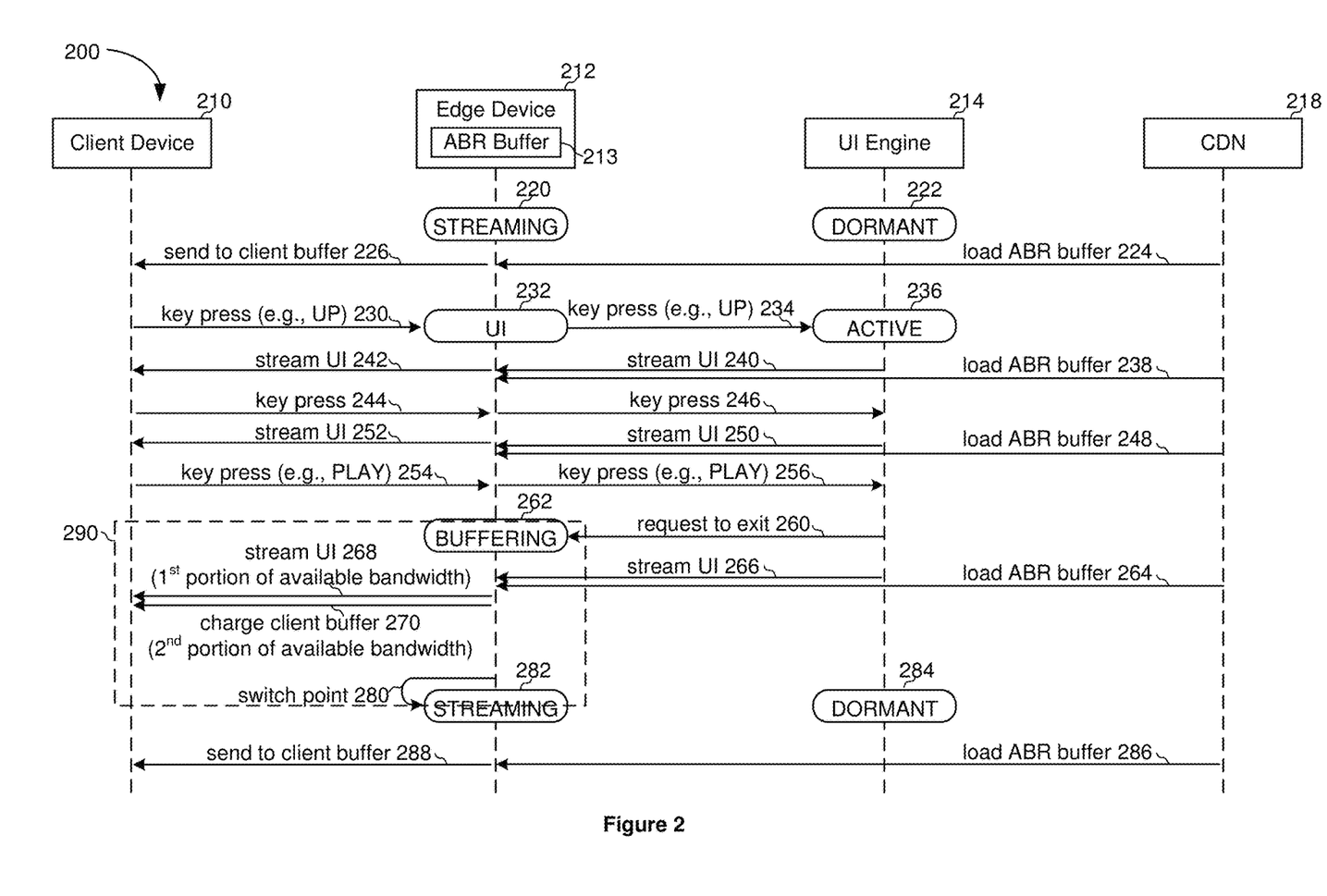
FIG. 2 is a sequence diagram illustrating state transitions in response to user inputs in the exemplary multimedia content delivery system, in accordance with some embodiments.

FIG. 2 is a sequence diagram 200 illustrating state transitions in response to user inputs in the exemplary content delivery system 100 in accordance with some embodiments. In some embodiments, when an edge device 212 (e.g., the edge device 150, FIG. 1) streams buffered content (e.g., an ABR video) to a client device 210 (e.g., the client device 160, FIG. 1), the edge device 212 is in a streaming state 220. In the streaming state 220, a UI engine 214 (e.g., the low latency content generator 130, FIG. 1) is in a dormant state 222. As such, the edge device 212 streams the ABR video without showing UI elements, e.g., presenting a full screen ABR video without showing a timeline or buttons.

In some embodiments, the edge device 212 includes an ABR buffer 213 for storing at least a portion of the buffered content received from a CDN 218, e.g., N seconds of an ABR video. The ABR buffer 213 can be drained when the edge device 212 sends the buffered content to the client device 210, as will be described in steps 226, 270, and 288 below. The CDN 218 (e.g., the buffered content provider 140, FIG. 1) sends the buffered content to the edge device 212, and the edge device 212 loads the ABR buffer 213 in step 224. In step 226, the edge device 212 sends the buffered content to the client device 210 to fill a client buffer on the client device 210 (e.g., the client buffer 162, FIG. 1), such as filling N seconds of ABR video in the client buffer.

In some embodiments, when the client device 210 receives a user input, such as the user pressing an up button on a remote control, the client device 210 sends the key press as a request for a UI to the edge device 212 in step 230 along with other information, e.g., session state cookies indicating that a UI is being displayed, a UI is being requested, user interactions, network information (e.g., client IP), geographical information, a client user agent, a timestamp, a household identifier, a device identifier, a device type, and/or media content item identifier, etc. The edge device 212, in response to receiving the request, enters a UI state 232 and passes the request to the UI engine 214 in step 234. In response to receiving the request, the UI engine 214 enters an active state 236 and generates a UI (e.g., rendering a UI video) that captures the result of the user action. The resulting UI video is relayed and streamed to the client device 210 via the edge device 212 in steps 240 and 242. In some embodiments, the edge device 212 continues loading the ABR data from the CDN 218 in step 238, but ceases transmission of the ABR data to the client device 210 when the edge device 212 is in the UI state 232. In some embodiments, when the edge device 212 is in the UI state 232, the UI engine 214 obtains content from the CDN 218 to composite the UI, e.g., to overlay a UI over an ABR video and generate a blended video. The UI engine 214 then sends the blended video to the edge device 212 for streaming to the client device 210 in steps 240 and 242.

In some embodiments, the user may further interact with the UI, e.g., the client device 210 detecting one or more key presses. For each user interaction, the client device 210 sends a request to the edge device 212 in step 244, and the edge device 212 again passes the request to the UI engine 214 in step 246. In response to receiving the request, the UI engine 214 renders more UI video frames that capture the result of the user action. The resulting UI video is relayed and streamed to the client device 210 via the edge device 212 in steps 250 and 252. Further, in some embodiments, the edge device 212 continues loading the ABR data from the CDN 218 in step 248, but ceases transmission of the ABR data to the client device 210 when the edge device is in the UI state 232.

In step 254, the client device 210 sends a user input to the edge device 212, e.g., the user pressing the PLAY button, and the edge device 212 forwards the key press to the UI engine 214 in step 256. In some embodiments, the UI engine 214 determines that the user input corresponds to a pre-defined user input, which indicates a request to exit the UI. The UI engine 214 signals the edge device 212 to exit the UI state 232 in step 260 and enter a buffering state 262 so that the requested ABR video can be played to the user.

In the buffering state 262, the edge device 212 loads the ABR data from the CDN 218 in step 264, e.g., loading the requested ABR video. Further, in the buffering state 262, the edge device 212 continues to receive the UI video from the UI engine 214 as shown in step 266. In step 268, the edge device continues to stream the UI video to the client device 210 and at the same time attempts to charge the client buffer by transmitting the content of the ABR buffer 213 to the client device 210 in step 270. In some embodiments, when the client buffer is filled with a deep set of ABR frames, e.g., ABR data in the client buffer that are more than a threshold amount, the edge device 212 identifies a switch point 280 and exits the buffering state 262 to enter a streaming state 282, e.g., switching at the next occurring I-frame. Further, when the edge device 212 enters the streaming state 282, the UI engine 214 enters a dormant state 284 to stop providing the UI video to the edge device 212. As such, the edge device streams the ABR video without showing further UI elements. To stream the ABR video, the CDN 218 loads the ABR buffer 213 on the edge device 212 in step 286, so that the edge device 212 can send the ABR video frames to the client device 210 to fill the client buffer in step 288.

Upon entering the buffering state 262 and before the switch point 280, as indicated by a box 290 with dashed borders, the edge device 212 attempts to fill the client buffer with the ABR data, and at the same time, the UI is being transmitted to the client device 210. As such, the available bandwidth is consumed by both streaming the UI and sending the ABR frames to fill the client buffer. Accordingly, the edge device 212 allocates a first portion of the available bandwidth to streaming the UI (e.g., in step 268) and a second portion of the available bandwidth to charging or filling the client buffer for the ABR frames (e.g., in step 270). For an interactive user experience, the sooner the client buffer is filled with sufficient ABR data, the sooner the switching from the UI video to the ABR video would occur. At the same time, for an interactive user experience, the UI video being streamed and presented also requires a reasonable amount of bandwidth. As will be described in further detail below, the edge device 212 in accordance with some embodiments allocates the available bandwidth based on characteristics of the UI and/or the ABR data to ensure fast ABR data loading and quality UI streaming.

Figure 3:
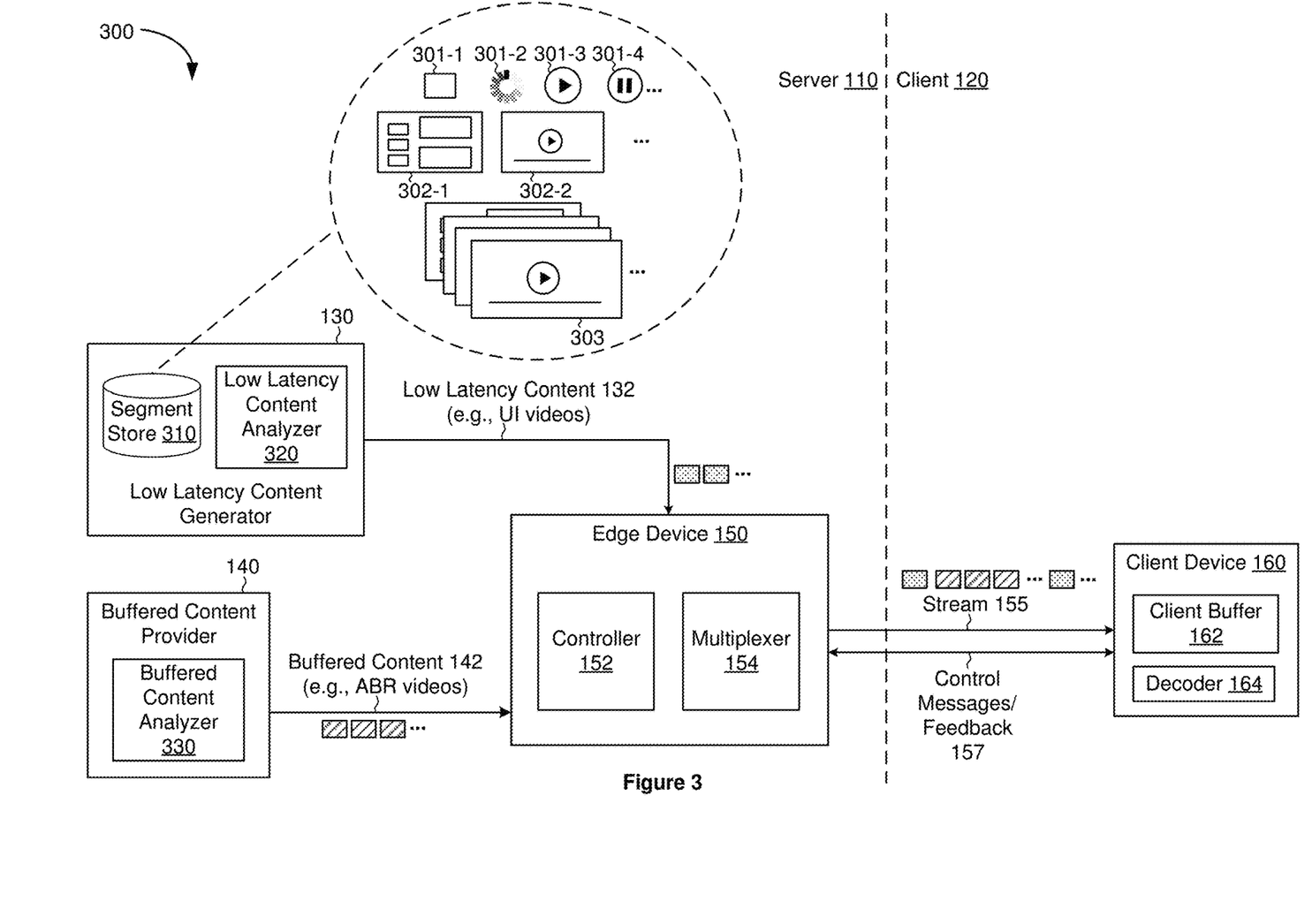
FIG. 3 is a block diagram illustrating bandwidth allocation based on outputs from exemplary analyzers, in accordance with some embodiments.

FIG. 3 is a block diagram 300 illustrating bandwidth allocation based on outputs from analyzers 320 and 330 in the exemplary content delivery system 100 in accordance with some embodiments. In some embodiments, the controller 152 obtains the characteristics of the low latency content 132 from the low latency content analyzer 320 and/or obtains the characteristics of the buffered content 142 from the buffered content analyzer 330, and determines the bandwidth allocation between the low latency content 132 and the buffered content 142 based at least in part on the bandwidth requirement of the low latency content 132 and/or the buffered content 142. The multiplexer 154 then multiplexes the low latency content 132 and the buffered content 142 into the stream 155 according to the bandwidth allocation determined by the controller 152 in accordance with some embodiments.

In some embodiments, the low latency content generator 130 includes a segment store 310 and a low latency content analyzer 320. In some embodiments, the segment store 310 stores UI objects 301-303 rendered by the low latency content generator 130. For instance, the low latency content generator 130 renders UI artifacts into UI objects 301, such as rendering a banner into a UI object 301-1, a progress indicator into a UI object 301-2, a play button into a UI object 301-3, and a pause button into a UI object 301-4, etc. In another example, the low latency content generator 130 renders UIs into UI objects 302, such as rendering a catalog UI into a UI object 302-1 and rendering a video play UI into a UI object 302-2, etc. In yet another example, the low latency content generator 130 records and renders a UI video sequence 303 that corresponds to a UI transition in response to user actions.

In some embodiments, the rendered UI objects in the segment store 310 are tagged with attributes and/or characteristics of the UI objects, such as user action(s), the duration of the video sequence, the number of frames, and/or the complexity of the video sequence, etc. In some embodiments, the tags are recorded as metadata in the segment store 310 and associated with the UI objects 301-303. In some embodiments, the low latency content generator 130 generates the low latency content 132 using the rendered UI objects 301-303 and the low latency content analyzer 320 obtains characteristics of the low latency content 132 and determines the bandwidth requirement for the low latency content 132 based on attributes of the rendered UI objects 301-303, e.g., calculating the bandwidth requirement for a UI or a UI transition as a function of the characteristics of the UI elements in the UI or the UI transition.

In some embodiments, when preparing the low latency content 132, the low latency content generator 130 provides inputs to the low latency content analyzer 320 to facilitate the bandwidth requirement determination. In some embodiments, when preparing a UI with a spinning progress indicator, the low latency content generator 130 signals that the type of the UI being generated, e.g., whether the UI can be rendered in a low action mode. For example, when rendering a UI with a spinning progress indicator, the low latency content generator 130 signals the low latency content analyzer 320 the enablement of the UI in a low action mode, indicating providing such UI at low quality is acceptable. With such an indication, when a decrease in bandwidth is necessary, the low latency content generator 130 can enter a low action mode and provide a lower quality UI with a spinner. In another example, if there is also text on the UI in addition to the spinning progress indicator, the low latency content generator 130 can indicate to the low latency content analyzer 320 that low quality for such a UI is less acceptable. As such, relative to the UI with only the spinner, the UI with text and the spinner has a higher bandwidth requirement and is less flexible with respect to bandwidth reduction.

In some embodiments, the low latency content analyzer 320 also obtains feedback 157 from the client device 160 on the client side 120 via the edge device 150. Based on the feedback 157, the low latency content analyzer 320 updates the bandwidth requirement for the UI objects 301-303 (e.g., by revising the tags and/or metadata associated with the UI objects 301-303). As such, the low latency content analyzer 320 maintains the historical data for determining the bandwidth requirement of the low latency content 132 for improved accuracy in accordance with some embodiments.

In some embodiments, the controller 152 on the edge device 150 determines the bandwidth allocation between the low latency content 132 and the buffered content 142 based at least in part on the bandwidth requirement of the buffered content 142. In some embodiments, the buffered content provider 140 includes a buffered content analyzer 330 that analyzes characteristics of the buffered content 142, e.g., categories and/or types of the buffered content, and provides the bandwidth requirement for the buffered content 142. In some embodiments, the buffered content analyzer 330 indicates the bandwidth requirement for a certain portion of the ABR videos. For example, a brief duration of a low bitrate sitcom or comedy is acceptable for user experience. For such ABR videos, the buffered content analyzer 330 indicates the lower bandwidth requirement for the duration of loading the buffered content 142 while streaming the low latency content 132.

It should be also noted that in FIG. 3, any parts of the components on the server side 110 can be deployed and/or re-configured on one or more servers that are not co-located, e.g., separated and/or distributed. For example, the buffered content analyzer 330 can be separate and distinct from the buffered content provider 140, or on a different device such as the edge device 150. In another example, the segment store 310 and/or the low latency content analyzer 320 can be a part of the low latency content generator 130 (e.g., as part of a UI engine) or separate from the low latency content generator 130 (e.g., shared by a pool of UI engines).

Figure 4:
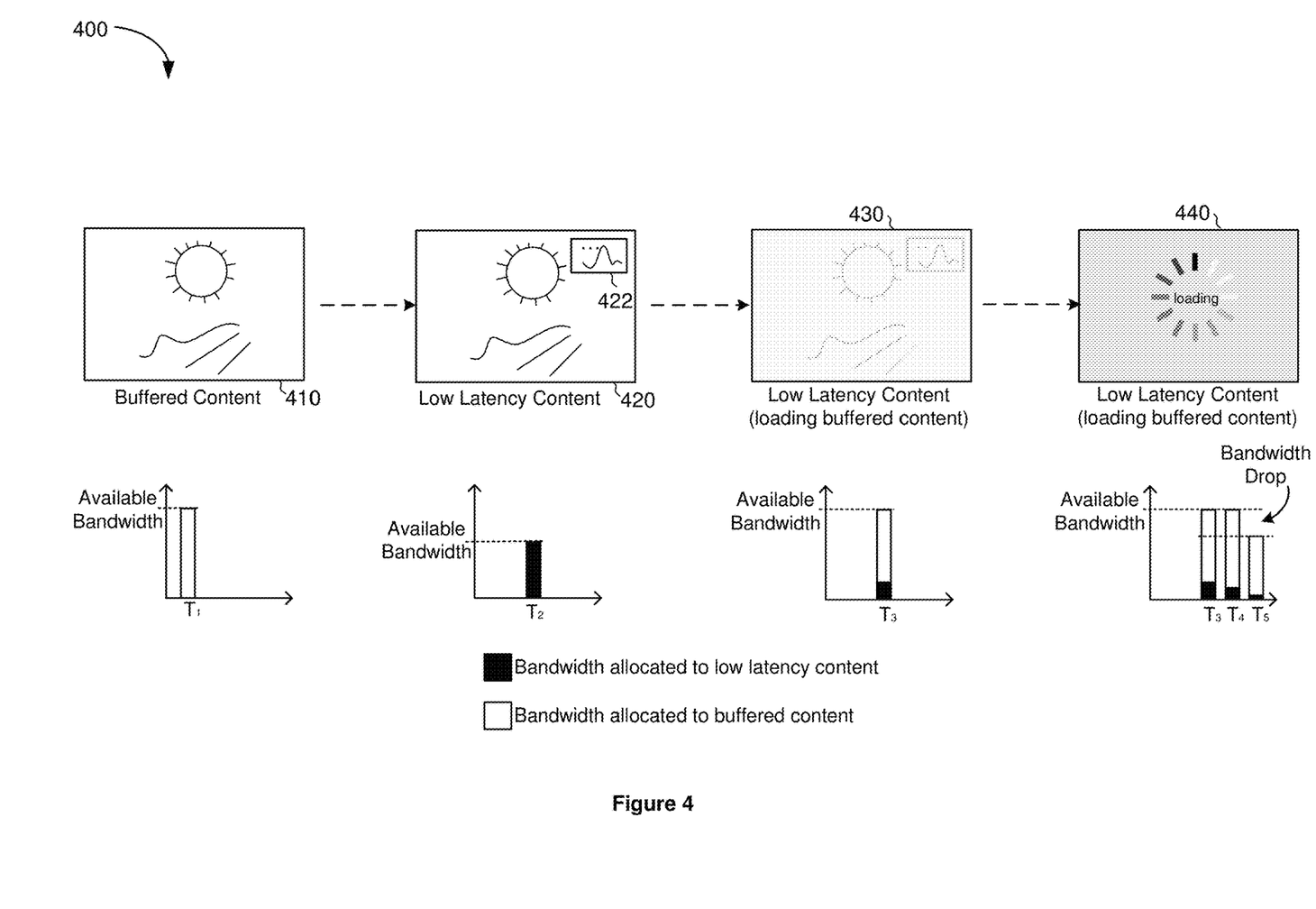
FIG. 4 is a diagram illustrating various bandwidth allocations based on characteristics of low latency content, in accordance with some embodiments.

FIG. 4 is a diagram 400 illustrating various bandwidth allocations based on characteristics of low latency content in accordance with some embodiments. In some embodiments, the various bandwidth allocations illustrated in FIG. 4 is performed by an edge device (e.g., the edge device 150 in FIG. 1 and/or edge device 212 in FIG. 2), which receives low latency content from a low latency content generator (e.g., the low latency content generator 130, FIGS. 1 and 3)

and receives buffered content from a buffered content provider (e.g., the buffered content provider 140, FIGS. 1 and 3).

At time $T_1$, when buffered content such as an ABR video 410 is being presented to the client, as described above with reference to FIG. 2, the edge device is in the streaming state and the available bandwidth is allocated to sending ABR frames of the ABR video 410. When the edge device receives a user input, such as a key press, the edge device switches to the UI state and streams low latency content, e.g., presenting a UI video 420 at time $T_2$. Thus, at time $T_2$, the edge device allocates the available bandwidth to sending UI frames of the UI video 420, where the UI video 420 shows a small window 422 on top of a movie scene.

In some embodiments, the user may further interact with the UI, such as pressing one or more keys to navigate before selecting a media asset to play. As described above with reference to FIG. 2, when the UI engine receives a predefined user input (e.g., the PLAY button) indicating a request to end the UI state, the edge device enters into the buffering state. In the buffering state, while the low latency content, such as a UI 430 corresponding to a transition to the selected media asset, is being presented, the edge device is also loading the selected media asset into the client buffer. As such, at time $T_3$, the edge device allocates a portion of the available bandwidth to loading the buffered content and another portion of the available bandwidth to streaming UI 430.

In some embodiments, depending on the characteristics of the low latency content, the edge device dynamically adjusts the bandwidth allocation. For example, during the transition, a UI 440 including a progress indicator is presented to the user. Based on historical data, the low latency content analyzer 320 (FIG. 3) determines that a UI with a spinning wheel as a progress indicator does not require much bandwidth for a satisfactory user experience. Accordingly, the low latency content generator 130 signals the edge device to enter a low action mode. At time $T_4$, the edge device lowers the bandwidth allocation to the UI 440 and as a result, more bandwidth can be allocated to loading the selected media asset. As explained above with reference to FIG. 3, in some embodiments, when preparing the low latency content, the low latency content generator 130 can also provide feedback to the low latency content analyzer 320. As such, though not shown in FIG. 4, when preparing the low latency content 440 with the spinning progress indicator, in the case of having text on the UI in addition to the spinning progress indicator, the reduction to the low latency content bandwidth allocation at time $T_4$ may be smaller to maintain the quality of the UI.

In some embodiments, the edge device also adjusts the bandwidth allocation when the available bandwidth changes, e.g., a drop in the available bandwidth in the case of degradation of the network condition. For example, at time $T_5$, when the available bandwidth decreases, the edge device adjusts the amount of bandwidth allocated to the low latency content and the buffered content. In some embodiments, the adjustments to the bandwidth allocation are proportional to the changes to the available bandwidth, e.g., increasing or decreasing by the same percentage. In some other embodiments, the edge device can assign weights to the low latency content and the buffered content (e.g., based on the type of the low latency content as obtained by the low latency content analyzer 320 as described above with reference to FIG. 3). In such embodiments, the adjustments to the bandwidth allocation are disproportional to the changes to the available bandwidth. For example, the edge device may determine that loading the buffered content is more important than presenting a complex UI, thus assigning more weights to loading the buffered content and/or changing to a less complex or lower bitrate UI. Consequently, when the available bandwidth decreases, the edge device may decrease the bandwidth allocated to the low latency content by a larger amount than the decrease to the bandwidth allocated to loading the buffered content, e.g., by presenting less animation or even a still image while attempting to maintain the amount of bandwidth allocated to loading the ABR video.

Figure 5:
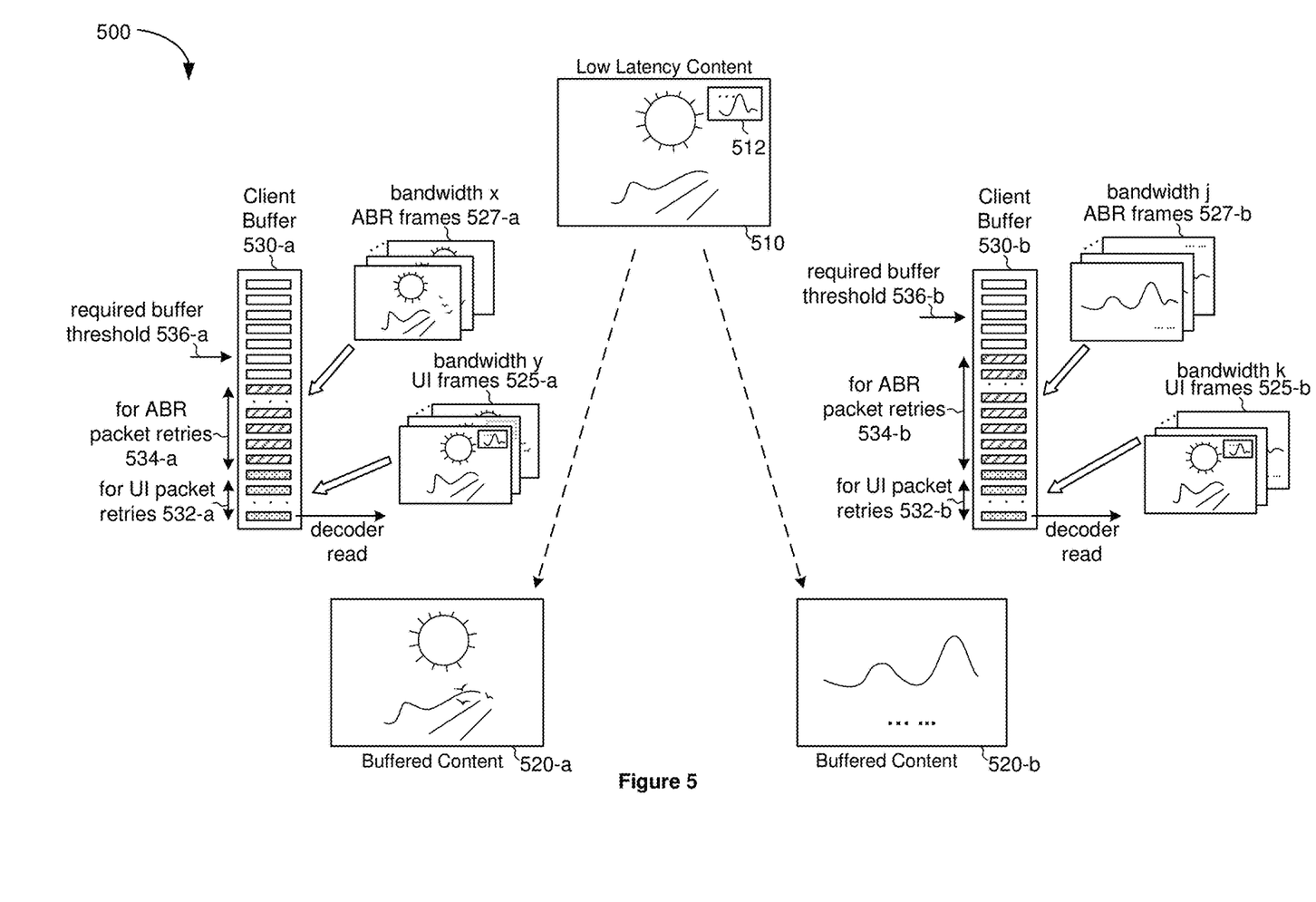
FIG. 5 is a diagram illustrating various bandwidth allocations based on characteristics of buffered content, in accordance with some embodiments.

FIG. 5 is a diagram 500 illustrating various bandwidth allocations based on characteristics of buffered content in accordance with some embodiments. In some embodiments, the various bandwidth allocations illustrated in FIG. 5 is performed by an edge device (e.g., the edge device 150 in FIG. 1 and/or edge device 212 in FIG. 2), which receives low latency content from a low latency content generator (e.g., the low latency content generator 130, FIGS. 1 and 3) and receives buffered content from a buffered content provider (e.g., the buffered content provider 140, FIGS. 1 and 3).

In FIG. 5, the low latency content, e.g., a UI 510 with a small window 512 being displayed on top of a movie scene providing a preview of another media asset, is being presented. In some embodiments, the user may further interact with the UI, such as pressing one or more keys to browse different media assets before selecting a media asset to play, e.g., selecting to play buffered content 520-a or 520-b (collectively referred to hereinafter as the buffered content 520).

During the transition, the client device uses a client buffer 530, e.g., the client buffer 530-a or the client buffer 530-b, to compensate for variations in packet transmission rate, packet jitter, and/or packet loss. In some embodiments, the client device uses a first portion 532 of the client buffer 530 for storing low latency content (e.g., UI frames 525) and a second portion 534 of the client buffer 530 for storing buffered content (e.g., ABR frames 527), e.g., storing the UI frames 525-a in the first portion 532-a and storing the ABR frames 527-a in the second portion 534-a, or storing the UI frames 525-b in the first portion 532-b and storing the ABR frames 527-b in the second portion 534-b.

Also, during the transition and before the switch point, in some embodiments, the edge device receives from the buffered content analyzer 330 (FIG. 3) the bandwidth requirement for at least a portion of the buffered content. In some embodiments, the bandwidth requirement is represented by a required buffer threshold 536, e.g., the required buffer threshold 536-a for the buffered content 520-a or the required buffer threshold 536-b for the buffered content 520-b. The edge device then uses the required buffer threshold 536 to facilitate the determination of the switch point 280 (FIG. 2). In some embodiments, the required buffer threshold 536 defines how full the client buffer 530 ought to be for the switching from the low latency content 510 to the buffered content 520 to take place, e.g., how full the client buffer 530-a ought to be for the switching to take place or how full the client buffer 530-b ought to be for the switching to take place. Upon reaching the required buffer threshold 536, there are sufficient ABR frames for the system to provide a strong quality of experience. As such, a higher value of the required buffer threshold 536 corresponds to a stronger quality of experience. Conversely, a lower value of the required buffer threshold 536 corresponds to a lower quality of experience.

To fill a deeper client buffer 530 within a time limit, e.g., as quickly as possible for an interactive user experience, more bandwidth is required for loading the ABR frames 527 into the client buffer 530. For example, based on the information from the buffered content analyzer 330 (FIG. 3), the edge device determines that the ABR frames 527-*b* corresponding to the constantly changing charts and graphs are more complex than the ABR frames 527-*a* showing a movie scene of a road on a sunny day. Further, the edge device may determine that lowering the bitrate for the duration of the buffer state for certain types or categories of media content, such as the movie scene, does not significantly impact the user experience. As such, the edge device in some embodiments sets the required buffer threshold 536-*b* for the charts and graphs corresponding to the buffered content 520-*b* higher than the required buffer threshold 536-*a* for the movie scene corresponding to the buffered content 520-*a*.

Accordingly, when loading the client buffer 530, based on the status of the client buffer 530, a percentage of the buffer that is occupied, and/or the required bandwidth threshold 536, the edge device selects the bandwidth allocation and/or transmission rate to increase the chance of reaching the required buffer threshold 536. In some embodiments, the edge device allocates the bandwidth to loading the ABR frames 527 such that the transmission rate is inversely proportional to the bits stored in the client buffer 530. For example, in FIG. 5, based on the high required buffer threshold 536-*b* and/or the status of the client buffer 530-*b*, the edge device may increase the bandwidth allocated to loading the ABR frames 527-*b*. In another example, based on the relatively low required buffer threshold 536-*a* and/or the status of the client buffer 530-*a*, the edge device may maintain the bandwidth allocation to loading the ABR frames 527-*a*, e.g., a lower bandwidth allocation than the bandwidth allocated to loading the ABR frames 527-*b*.

It should be noted that the depth of the client buffer 530 in FIG. 5 represents the number of frames and/or bits. For example, to reach the required buffer threshold 536, the number of frames for low quality (or low bitrate) ABR in the client buffer 530-*a* is similar to the number of frames for high quality (or high bitrate) ABR in the client buffer 530-*b*. Because the high quality ABR frames 527-*b* for the buffered content 520-*b* have more bits per frame than the low quality ABR frames 527-*a* for the buffered content 520-*a*, with the same number of frames, the client buffer 530-*b* has more bits for the high quality ABR frames 527-*b* than the client buffer 530-*a* for the low quality ABR frames 527-*a*. As a result, the high quality buffered content 520-*b* requires a deeper client buffer 530-*b* than the low quality buffered content 520-*a* even though the number of frames for reaching the required buffer threshold 536-*b* is the same as the number of frames for reaching the required buffer threshold 536-*a*.

In some embodiments, the transition from the low latency content 510 to the buffered content 520 takes place when the buffered content 520 can be decoded, e.g., at the start of a segment and/or the next I-frame by the decoder 164 (FIG. 1). In some embodiments, for a seamless transition, the low latency content 510 and the buffered content 520 are aligned, e.g., according to the presentation time. In some other embodiments, the transition does not require aligning the low latency content 510 and the buffered content 520. For example, the edge device can keep presenting the loading progress indicator UI 440 as shown in FIG. 4 until the required buffer threshold 536 is reached.

In the case of aligning the low latency content 510 and the buffered content 520, when the buffered content 520 does not fill enough of the client buffer 530 in time (or the edge device determines that the buffered content 520 will not fill the client buffer 530 within a threshold time limit), the portion for ABR packet retries 534 in the client buffer 530 is filled with the next segment in some embodiments. In such embodiments, while loading the next segment of the buffered content 520, the edge device maintains the bandwidth allocation and streams the low latency content 510 to the client device for another segment to ensure the alignment of the low latency content 510 and the buffered content 520 at the transition point in accordance with some embodiments. In some other embodiments, instead of maintaining the bandwidth allocation, the edge device transmits lower bitrate buffered content to replace the portion 534 in the client buffer 530 while streaming the low latency content 510. Transmitting the lower bitrate buffered content 520 increases the chances of achieving the required buffer threshold 536, thus reaching the switch point faster.

Figure 6A:
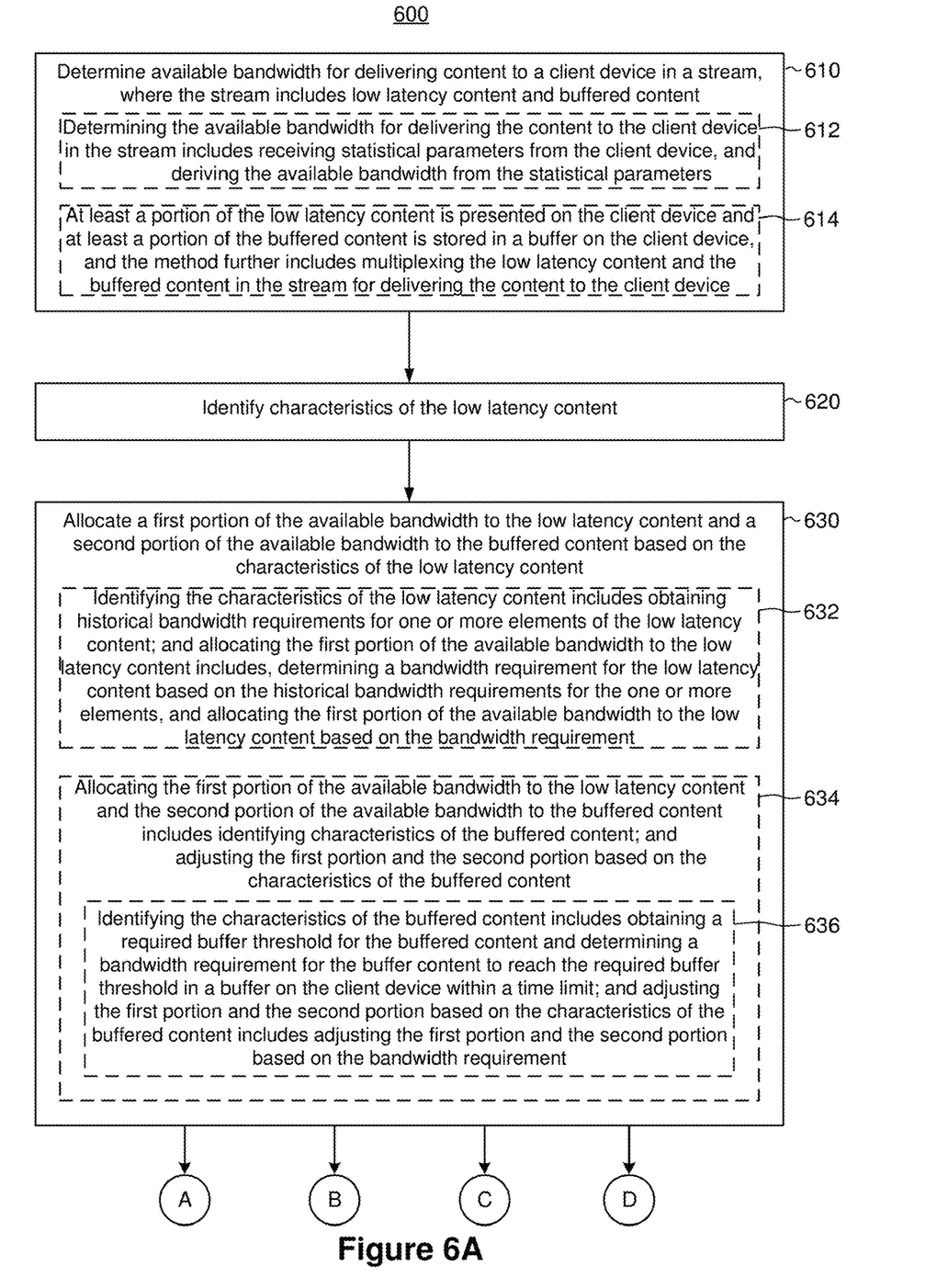
FIGS. 6A and 6B are flowcharts illustrating a bandwidth allocation method, in accordance with some embodiments.
Figure 6B:
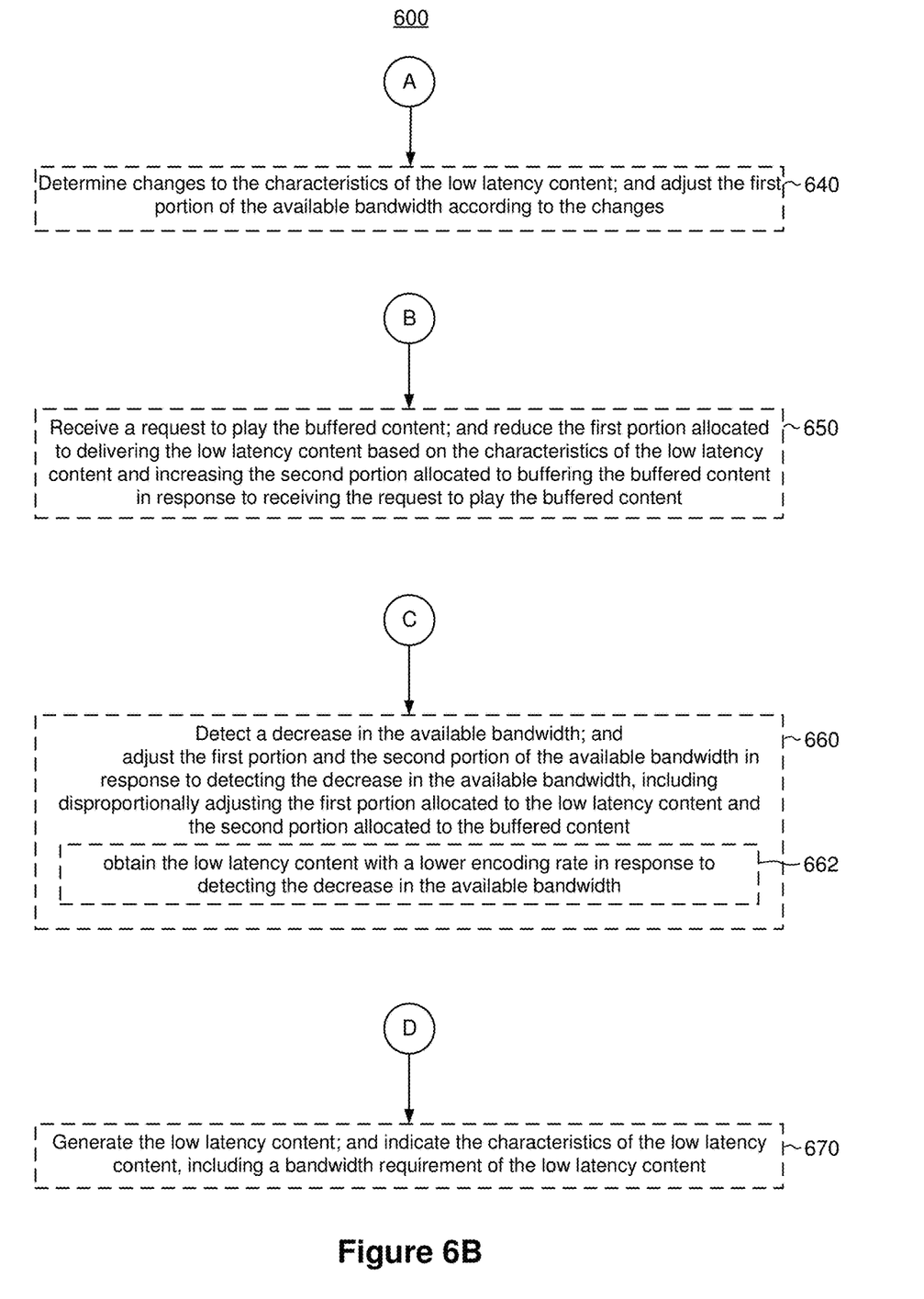

FIGS. 6A and 6B are flowcharts illustrating a bandwidth allocation method 600 in accordance with some embodiments. In some embodiments, the bandwidth allocation method 600 is performed on a server, e.g., a device on the server side 110 in FIG. 1. In some embodiments, the method 600 is performed on an edge device, e.g., the edge device 150 in FIG. 1, where the edge device includes one or more processors (e.g., the controller 152, FIG. 1) and a non-transitory memory (e.g., including the ABR buffer 213, FIG. 2).

The method 600 begins with the server determining available bandwidth for delivering content to a client device (e.g., the client device 160, FIG. 1) in a stream (e.g., the single stream 155 carrying the client video, FIG. 1), as represented by block 610. In some embodiments, the stream includes low latency content and buffered content. For example, as shown in FIG. 3, the single stream 155 carrying the client video includes both the low latency content 132 and the buffered content 142.

In some embodiments, as represented by block 612, determining the available bandwidth for delivering the content to the client device in the stream includes receiving statistical parameters from the client device (e.g., in RTCP messages as feedback 157, FIG. 1), and deriving the available bandwidth from the statistical parameters. For example, statistical parameters can include data indicating packet loss, historical data of successful bitrate time window, the status of the client buffer such as a percentage of the buffer that is occupied or filled and/or a percentage of the buffer that is empty, etc.

In some embodiments, as represented by block 614, at least a portion of the low latency content is presented on the client device and at least a portion of the buffered content is stored in a buffer on the client device, and the method 600 further includes multiplexing the low latency content and the buffered content in the stream for delivering the content to the client device. For example, in FIG. 3, the multiplexer 154 multiplexes the low latency content 132 and the buffered content 142 into a single stream 155 for delivering the client video to the client device 160. The low latency content such as the loading progress indicator as shown in FIG. 4 is being presented in the UI 430 while the buffered content (e.g., an ABR video) is being loaded. In another example, in FIG. 2, the UI is being streamed in step 268 and at the same time, the client buffer is being filled with ABR frames in step 270.

Still referring to FIG. 6A, the method 600 continues, as represented by block 620, with the server identifying characteristics of the low latency content, e.g., identifying the complexity of the UI element(s), bits required for encoding the UI element(s), UI transition complexity, the number of frames required for a transition, etc. Further, the method 600 continues, as represented by block 630, with the server allocating a first portion of the available bandwidth to the low latency content and a second portion of the available bandwidth to the buffered content based on the characteristics of the low latency content. As such, in some embodiments, the server identifies the characteristics of the low latency content based on historical data and/or through learning. As represented by block 632, in some embodiments, identifying the characteristics of the low latency content includes obtaining historical bandwidth requirements for one or more elements of the low latency content. In such embodiments, allocating the first portion of the available bandwidth to the low latency content includes determining a bandwidth requirement for the low latency content based on the historical bandwidth requirements for the one or more elements, and allocating the first portion of the available bandwidth to the low latency content based on the bandwidth requirement.

For example, based on historical data, the server learns that streaming an animation such as a progress indicator does not consume much bandwidth. Based on the historical data, when preparing the UI 440 that includes a loading progress indicator, the server lowers the bandwidth allocation to the UI 440 at time $T_4$, as shown in FIG. 4. In contrast, the server learns that UIs, in response to UI interactions such as scrolling up or down, require high bandwidth. As such, based on the historical high bandwidth allocation (and/or based on the calculation of the number of bits when preparing the UIs), when preparing UIs in response to scrolling up or down, the bandwidth allocated to such UIs is higher.

In some embodiments, as represented by block 634, allocating the first portion of the available bandwidth to the low latency content and the second portion of the available bandwidth to the buffered content includes identifying characteristics of the buffered content, and adjusting the first portion and the second portion based on the characteristics of the buffered content. As such, the bandwidth allocation can also be based on the characteristics of the buffered content, e.g., media assets in certain categories, certain types of videos, certain portions of videos, quality of the videos, importance of the videos, etc. For example, if the content is less critical or if a lower quality of the video for the duration of sending both the low latency content and the buffered content does not impact the user experience significantly, e.g., a cartoon or sitcom, the server may use a lower bitrate and allocate less bandwidth to the buffered content while streaming the low latency content. In some embodiments, as shown in FIG. 3, the buffered content analyzer 330 provides the characteristics of the buffered content 142. In some other embodiments, the low latency content generator 130 provides the characteristics of the buffered content. In particular, the edge device 150 forwards the requests from the client device 160 (e.g., the edge device 212 forwarding the key press to the UI engine 214 in step 256, FIG. 2), the low latency content generator 130 can derive from the requests the identifier of the requested buffered. As such, in some embodiments, the low latency content generator 130 derives the characteristics of the buffered content based on the identifier and provides the characteristics to the edge device.

In some embodiments, the characteristics of the buffered content are represented by a required buffer threshold for the buffered content and a time limit to reach the required buffer threshold for a satisfactory user experience, where the required buffer threshold defines the required depth of the buffer for the buffered content for the switching from presenting the low latency content to the buffered content to take place. In such embodiments, as represented by block 636, identifying the characteristics of the buffered content includes obtaining a required buffer threshold for the buffered content and determining a bandwidth requirement for the buffer content to reach the required buffer threshold in a buffer on the client device within a time limit, e.g., to reach the switch point as quickly as possible for an interactive user experience, and adjusting the first portion and the second portion based on the characteristics of the buffered content includes adjusting the first portion and the second portion based on the bandwidth requirement.

For example, as shown in FIG. 5, the required buffer threshold 536-a for the movie scene in the buffered content 520-a is different from the required buffer threshold 536-b for the charts and graphs in the buffered content 520-b. The difference in the required buffer thresholds 536 represents different characteristics of the buffered content 520-a and 520-b, e.g., showing a lower quality for a duration of the movie scene in the buffered content 520-a is not as critical as presenting constantly changing charts and graphs in the buffered content 520-b. As such, the server determines whether to increase the bandwidth allocation for loading the charts and graphs in the buffered content 520-b based on the high required buffer threshold 536-b and the time limit to reach the required buffer threshold 536-b, e.g., the amount of client buffer 530 to be filled and the current transmission rate. On the other hand, with the low required buffer threshold 536-a for the movie scene in the buffered content 520-a, even a low bandwidth allocation to loading the buffered content may be sufficient for filling the buffer with the ABR frames 527-a in time before the switch point.

Turning to FIG. 6B, as represented by block 640, in some embodiments, the method 600 further includes determining changes to the characteristics of the low latency content, and adjusting the first portion of the available bandwidth according to the changes. For example, in FIG. 4, while transitioning to the buffered content, the characteristics of the low latency content being presented change from the more complex UI 430 to the simpler UI 440 showing a progress indicator. Accordingly, in accordance with the changing characteristics, the server allocates more bandwidth to streaming the UI 430 at time $T_3$ than streaming the UI 440 at time $T_4$. Lowering the bandwidth allocation to the UI 440 would allow more bandwidth allocated to loading the buffered content and enable reaching the switch point faster.

In some embodiments, as represented by block 650, the method 600 further includes receiving a request to play the buffered content (e.g., in response to user input such as pressing a play button or non-user driven, such as timeout or server pushed messages, etc. that trigger transitions to the buffered content), and reducing the first portion allocated to delivering the low latency content based on the characteristics of the low latency content and increasing the second portion allocated to buffering the buffered content in response to receiving the request to play the buffered content. For example, in FIG. 4, in response to the user selecting the buffered content to play, the server reduces the amount of available bandwidth allocated to the low latency content and at the same time increases the amount of available bandwidth allocated to the buffered content between times $T_2$ and $T_3$. In some embodiments, a manifest associated with the buffered content such as an ABR video specifies the bitrate for the ABR video. Depending on the bitrate required for the ABR video, the server determines the amount of UI bandwidth decreased to maintain a reasonable UI presentation quality and the amount of ABR bandwidth increased to quickly load the ABR video.

In some embodiments, as represented by block 660, the method 600 further includes detecting a decrease in the available bandwidth and adjusting the first portion and the second portion of the available bandwidth in response to detecting the decrease in the available bandwidth, including disproportionally adjusting the first portion allocated to the low latency content and the second portion allocated to the buffered content. For example, in FIG. 4, the server may have assigned a higher priority to loading the buffered content. As such, when the bandwidth drops between time $T_4$ and $T_5$, the server reduces the bandwidth allocated to the low latency content by a larger amount than the reduction to the bandwidth allocated to the buffered content. In such embodiments, as represented by block 662, the method 600 further includes obtaining the low latency content with a lower encoding rate in response to detecting the decrease in the available bandwidth. For example, the low latency content generator 130 in FIG. 1 can provide a simple animation or a still image that does not require much bandwidth. Presenting the simpler low latency content would free up bandwidth for loading the buffered content.

In some embodiments, as represented by block 670, the method 600 further includes generating the low latency content and indicating the characteristics of the low latency content, including a bandwidth requirement of the low latency content. For example, the characteristics of the low latency content can indicate whether an encoding rate of the low latency content is changeable, e.g., whether lowering (or increasing) the bitrate or quality of the low latency content is acceptable for user experience. The low latency content generator 130 in FIG. 3, when generating the UI 440 as shown in FIG. 4, can indicate that it is acceptable to lower the quality of the UI 440 with the loading progress indicator and that the bitrate of the UI 440 is changeable. Accordingly, as shown in FIG. 4, at time $T_4$, to free up the bandwidth loading the buffered content, the bandwidth allocated to the low latency content is decreased. In contrast, the bandwidth allocation to posters and/or a UI with text in addition to the progress indication may not be changeable because an interactive user experience requires maintaining the bitrate for the UI above a threshold.

Figure 7:
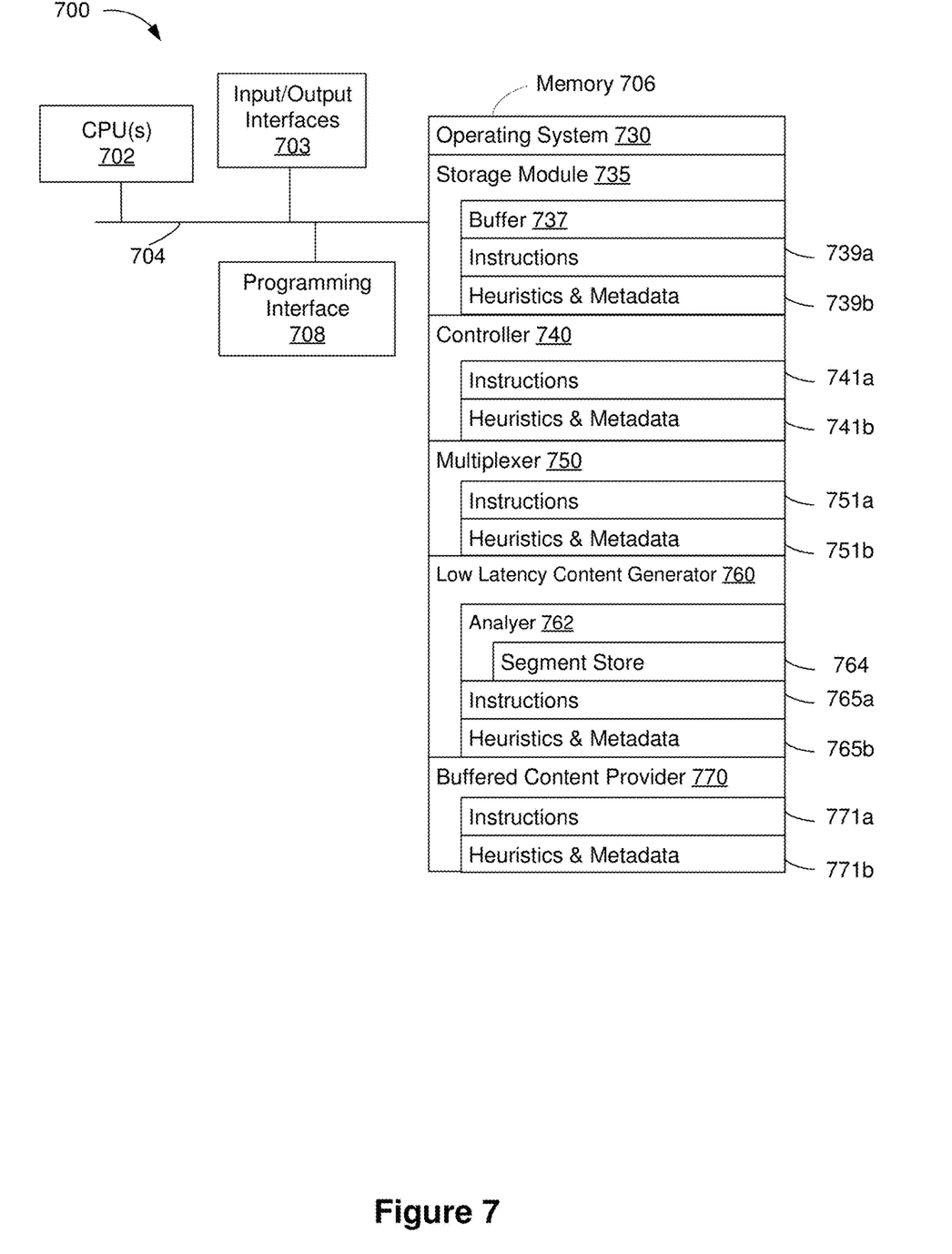
FIG. 7 is a block diagram of a computing device for bandwidth allocation, in accordance with some embodiments.

FIG. 7 is a block diagram of a computing device 700 for bandwidth allocation in accordance with some embodiments. In some embodiments, the computing device 700 corresponds to one or more of the computing devices on the server side 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more input/output interfaces 703 (e.g., input devices, sensors, a network interface, a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 735, a controller 740, a multiplexer 750, a low latency content generator 760, and a buffered content provider 770. In some embodiments, one or more instructions are included in a combination of logic and non-transitory memory. The operating system 730 includes procedures for handling various basic system services and for performing hardware dependent tasks.

In some embodiments, the storage module 735 includes a buffer 737 (e.g., the ABR buffer 213, FIG. 2) that is configured to provide storage for buffering content before sending to the client device. To that end, the storage module 735 includes a set of instructions 739a and heuristics and metadata 739b.

In some embodiments, the controller 740 (e.g., the controller 152, FIG. 1) is configured to determine the switching between low latency content and buffered content and allocate bandwidth to the low latency content and the buffered content. To that end, the controller 740 includes a set of instructions 741a and heuristics and metadata 741b.

In some embodiments, the multiplexer 750 (e.g., the multiplexer 154, FIG. 1) is configured to multiplex the low latency content and the buffered content to a single stream. To that end, the multiplexer 750 includes a set of instructions 751a and heuristics and metadata 751b. In some embodiments, since the controller 740 along with the multiplexer 750 can be located on a separate device (e.g., the edge device 150, FIG. 1), the controller 740 and/or the multiplexer 750 are implemented with separate hardware, firmware, and/or instructions stored in a separate non-transitory memory, e.g., the controller 740 being a processor.

In some embodiments, the low latency content generator 760 (e.g., the low latency content generator 130, FIGS. 1 and 3) is configured to generate low latency content. In some embodiments, the low latency content generator 760 includes an analyzer 762 that is configured to analyze historical data stored in a segment store 764 (e.g., the segment store 310, FIG. 3) for determining and/or estimating bandwidth requirements for the low latency content generated by the low latency content generator 760. To that end, the low latency content generator 760 includes a set of instructions 765a and heuristics and metadata 765b.

In some embodiments, the buffered content provider 770 (e.g., the buffered content provider 140, FIG. 1) is configured to provide buffered content. To that end, the buffered content provider 770 includes a set of instructions 771a and heuristics and metadata 771b.

Although the storage module 735, the controller 740, the multiplexer 750, the low latency content generator 760, and the buffered content provider 770 are illustrated as residing on a single computing device 700, it should be understood that in other embodiments, any combination of the storage module 735, the controller 740, the multiplexer 750, the low latency content generator 760, and the buffered content provider 770 can reside in separate computing devices in various embodiments. For example, in some embodiments, each of the storage module 735, the controller 740, the multiplexer 750, the low latency content generator 760, and the buffered content provider 770 resides on a separate computing device. In another example, in some embodiments, the controller 740 and the multiplexer 750 reside on one computing device, e.g., the edge device 150 in FIG. 1, while the low latency content generator 760 and the buffered content provider 770 each resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a server including one or more processors and a non-transitory memory:
determining available bandwidth for delivering content to a client device in a stream, wherein the stream includes low latency content and buffered content;
identifying characteristics of the low latency content; and
allocating a first portion of the available bandwidth to the low latency content and a second portion of the available bandwidth to the buffered content based on the characteristics of the low latency content.

2. The method of claim 1, wherein determining the available bandwidth for delivering the content to the client device in the stream includes:
receiving statistical parameters from the client device; and
deriving the available bandwidth from the statistical parameters.

3. The method of claim 1, wherein at least a portion of the low latency content is presented on the client device and at least a portion of the buffered content is stored in a buffer on the client device, and the method further includes multiplexing the low latency content and the buffered content in the stream for delivering the content to the client device.

4. The method of claim 1, wherein:
identifying the characteristics of the low latency content includes obtaining historical bandwidth requirements for one or more elements of the low latency content; and
allocating the first portion of the available bandwidth to the low latency content includes,
determining a bandwidth requirement for the low latency content based on the historical bandwidth requirements for the one or more elements; and
allocating the first portion of the available bandwidth to the low latency content based on the bandwidth requirement.

5. The method of claim 1, wherein allocating the first portion of the available bandwidth to the low latency content and the second portion of the available bandwidth to the buffered content includes:
identifying characteristics of the buffered content; and
adjusting the first portion and the second portion based on the characteristics of the buffered content.

6. The method of claim 5, wherein:
identifying the characteristics of the buffered content includes obtaining a required buffer threshold for the buffered content and determining a bandwidth requirement for the buffered content to reach the required buffer threshold in a buffer on the client device within a time limit; and
adjusting the first portion and the second portion based on the characteristics of the buffered content includes adjusting the first portion and the second portion based on the bandwidth requirement.

7. The method of claim 1, further comprising:
determining changes to the characteristics of the low latency content; and
adjusting the first portion of the available bandwidth according to the changes.

8. The method of claim 1, further comprising:
receiving a request to play the buffered content; and
reducing the first portion allocated to delivering the low latency content based on the characteristics of the low latency content and increasing the second portion allocated to buffering the buffered content in response to receiving the request to play the buffered content.

9. The method of claim 1, further comprising:
detecting a decrease in the available bandwidth; and
adjusting the first portion and the second portion of the available bandwidth in response to detecting the decrease in the available bandwidth, including disproportionally adjusting the first portion allocated to the low latency content and the second portion allocated to the buffered content.

10. The method of claim 9, further comprising:
obtaining the low latency content with a lower encoding rate in response to detecting the decrease in the available bandwidth.

11. The method of claim 1, further comprising:
generating the low latency content; and
indicating the characteristics of the low latency content, including a bandwidth requirement of the low latency content.

12. A server comprising:
one or more processors;
a non-transitory memory; and
one or more programs stored in the non-transitory memory, which, when executed, cause the one or more processors to perform operations comprising:
determining available bandwidth for delivering content to a client device in a stream, wherein the stream includes low latency content and buffered content;
identifying characteristics of the low latency content; and
allocating a first portion of the available bandwidth to the low latency content and a second portion of the available bandwidth to the buffered content based on the characteristics of the low latency content.

13. The server of claim 12, wherein determining the available bandwidth for delivering the content to the client device in the stream includes:
receiving statistical parameters from the client device; and
deriving the available bandwidth from the statistical parameters.

14. The server of claim 12, wherein at least a portion of the low latency content is presented on the client device and at least a portion of the buffered content is stored in a buffer on the client device, and the one or more programs further cause the one or more processors to perform the operations including multiplexing the low latency content and the buffered content in the stream for delivering the content to the client device.

15. The server of claim 12, wherein:
identifying the characteristics of the low latency content includes obtaining historical bandwidth requirements for one or more elements of the low latency content; and
allocating the first portion of the available bandwidth to the low latency content includes,
determining a bandwidth requirement for the low latency content based on the historical bandwidth requirements for the one or more elements; and
allocating the first portion of the available bandwidth to the low latency content based on the bandwidth requirement.

16. The server of claim 12, wherein allocating the first portion of the available bandwidth to the low latency content and the second portion of the available bandwidth to the buffered content includes:
identifying characteristics of the buffered content; and
adjusting the first portion and the second portion based on the characteristics of the buffered content.

17. The server of claim 16, wherein:
identifying the characteristics of the buffered content includes obtaining a required buffer threshold for the buffered content and determining a bandwidth requirement for the buffered content to reach the required buffer threshold in a buffer on the client device within a time limit; and
adjusting the first portion and the second portion based on the characteristics of the buffered content includes adjusting the first portion and the second portion based on the bandwidth requirement.

18. The server of claim 12, wherein the one or more programs further cause the one or more processors to perform the operations including:
determining changes to the characteristics of the low latency content; and
adjusting the first portion of the available bandwidth according to the changes.

19. The server of claim 12, wherein the one or more programs further cause the one or more processors to perform the operations including:
receiving a request to play the buffered content; and
reducing the first portion allocated to delivering the low latency content based on the characteristics of the low latency content and increasing the second portion allocated to buffering the buffered content in response to receiving the request to play the buffered content.

20. The server of claim 12, wherein the one or more programs further cause the one or more processors to perform the operations including:
detecting a decrease in the available bandwidth; and
adjusting the first portion and the second portion of the available bandwidth in response to detecting the decrease in the available bandwidth, including disproportionally adjusting the first portion allocated to the low latency content and the second portion allocated to the buffered content.

* * * * *